H. A. Wells.
Felting Machine.

Nº 2256. Patented Sep. 18, 1841.

UNITED STATES PATENT OFFICE.

HENRY A. WELLS, OF NEW YORK, N. Y.

MACHINE FOR HARDENING FELT-CLOTHS.

Specification of Letters Patent No. 2,256, dated September 18, 1841.

*To all whom it may concern:*

Be it known that I, HENRY AUGUSTUS WELLS, of the city, county, and State of New York, have invented an improvement on a machine heretofore used for hardening hat-bodies, and which, with this improvement, I use in my method of manufacturing cloth or other fabrics as described in my specification bearing even date herewith and designate a "hardening-machine;" and I do hereby declare that the following is a full and exact description thereof.

Figure 1:
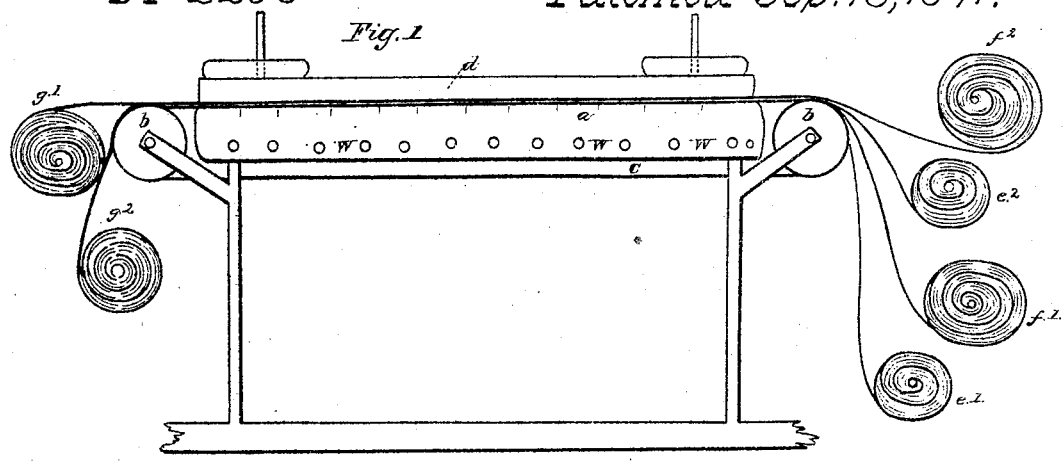
Figure 1:
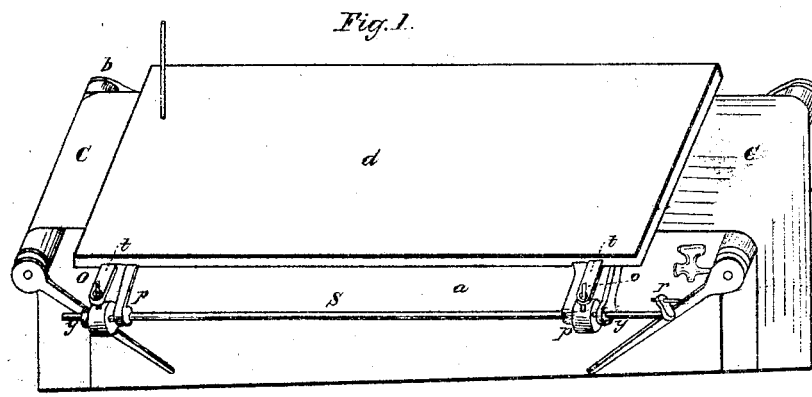
Figure 4:
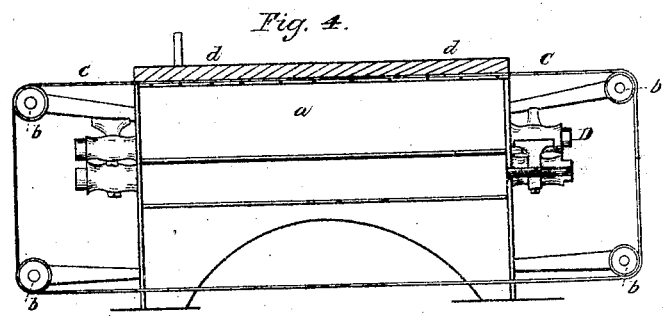

The machine with my improvement is represented in the accompanying drawings, Plate I, Figure 1; Plate II, Figs. 1, 2, and 3, and Plate 3, Fig. 4, and consists of two platens or broad smooth bodies an under one of which $a$, Fig. 1, Plates I, II and 3 is of metal is cast hollow and the upper face perforated at small intervals to allow the steam to escape which is introduced through a pipe or pipes fitted with a stop cock the steam being admitted as long as is required by the operation. A series of tubes W as represented in the drawing Plate I or in some other convenient position are contained within this metallic box. These tubes are made perfectly tight and do not allow the steam to escape upon the article which it is desired to harden. They are connected with a pipe or pipes by a tube into which they all enter and by a stop cock steam is admitted for the purpose of giving dry heat to or dry heating the articles to be hardened. This metallic box or platen is supported on legs or in other convenient manner. Over it passes a traveling or endless apron C Fig. 1, Plates I and II which is kept sufficiently stretched by the rollers $b$ $b$ Fig. 1, Plates I and II which may be two four or other convenient number.

Figure 2:
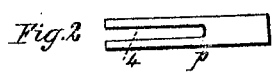
Figure 3:

The upper platen $d$ Fig. 1, Plates I and II, is fastened to the under one so as to allow the upper one to be raised as the lid of a trunk and also so as to allow it to receive an alternating motion when desired while resting on the under platen or any article that may be placed between them. This is done as follows (or it may be done by the other means): Two supporters $y$ $y$ Fig. 1, Plate II, are fastened to the under platen. Through these an axle $s$ passes and is made to turn in them by the crank $r$, having from one-half to three quarters of an inch throw. The upper platen is connected with this axle by the hinges $p$, $p$, Figs. 1, 2, and 3, Plate II, which are made with slots 4 and fastened to the upper platen by a screw whose head being on the underside prevents the upper platen from being disengaged from the hinges and at the same time allows it to slide on them and across the machine, as required. Fig. 2, Plate II, is a plan view of these hinges and Fig. 3, same plate, is a side view showing the position of the screw. The upper platen is connected to and receives motion from the axle $s$ by the connecting rods or straps $t$ $t$, Fig. 1, Plate II, which pass on to the pins $o$, $o$, projecting from the axle $s$, so that as the crank $r$ is turned from or toward the under platen the upper one is set in motion and the platen is carried for a short distance across the under platen and then back again.

In order to use this machine the upper platen $d$ is raised and the hat with its canvas or other article to be operated upon is drawn along on the traveling apron $c$ the length of the platen. The upper platen is then shut down and a weight or weights being placed on it, if necessary motion is given to it by moving the crank forward a short space. At the same time steam is admitted in the lower platen through the cock so as to produce a moist heat (by the escape of the steam through the perforated face of the under platen) on the hat or article to be hardened. When this operation has been continued sufficiently long the stop cock which has been open is closed and no more steam is allowed to enter that part of the under platen from which it can escape through the perforations in its upper face but the steam is admitted into the tubes $w$ and thus a dry heat is produced which is continued until the hat or article shall have been sufficiently hardened, the motion of the upper platen being kept up during the application of dry heat. The upper platen is then raised and another length of hat is subjected to the operation of the machine as before described.

What I claim in the above described machine is—

The method herein described of applying to the hat moist and dry heat in combination with the method herein described of applying friction thereto.

Witness my hand this twenty-fourth day of August, one thousand eight hundred and forty-one.

H. A. WELLS.

Witnesses:
B. K. MORSELL,
A. WILLIAMS.